(12) United States Patent
Benco et al.

(10) Patent No.: US 7,519,358 B2
(45) Date of Patent: Apr. 14, 2009

(54) OVER THE AIR PROVISIONING OF A WIRELESS MOBILE STATION USING IP MULTIMEDIA SUBSYSTEM MODE

(75) Inventors: David S. Benco, Winfield, IL (US);
Jaydutt B. Bhatt, Naperville, IL (US);
Sanjeev Mahajan, Naperville, IL (US);
Baoling S. Sheen, Naperville, IL (US);
Sandra L. True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 595 days.

(21) Appl. No.: 11/231,275

(22) Filed: Sep. 20, 2005

(65) Prior Publication Data

US 2007/0066292 A1 Mar. 22, 2007

(51) Int. Cl.
*H04M 3/00* (2006.01)
*H04Q 7/00* (2006.01)
*H04Q 7/24* (2006.01)

(52) U.S. Cl. ............... 455/418; 455/432.1; 455/432.2; 370/329; 370/349

(58) Field of Classification Search ............... 455/411, 455/418, 419, 432.1, 432.2; 370/329, 349, 370/338, 352
See application file for complete search history.

(56) References Cited

U.S. PATENT DOCUMENTS

| | | | |
|---|---|---|---|
| 6,195,546 B1 * | 2/2001 | Leung et al. ............. | 455/419 |
| 6,493,549 B1 * | 12/2002 | Axelson et al. ........... | 455/419 |
| 6,839,553 B2 * | 1/2005 | Park ....................... | 455/411 |

FOREIGN PATENT DOCUMENTS

WO  WO 2005/102017 A2  * 11/2005

* cited by examiner

*Primary Examiner*—Charles N Appiah
*Assistant Examiner*—Kiet Doan

(57) ABSTRACT

A method is provided enabling communication infrastructure equipment to initially provision and update shared secret data of a mobile station where the mobile station only uses IP Multimedia Subsystem protocol signaling to accomplish the provisioning and updating.

13 Claims, 8 Drawing Sheets

Figure 4- OTA SSD Update for IMS

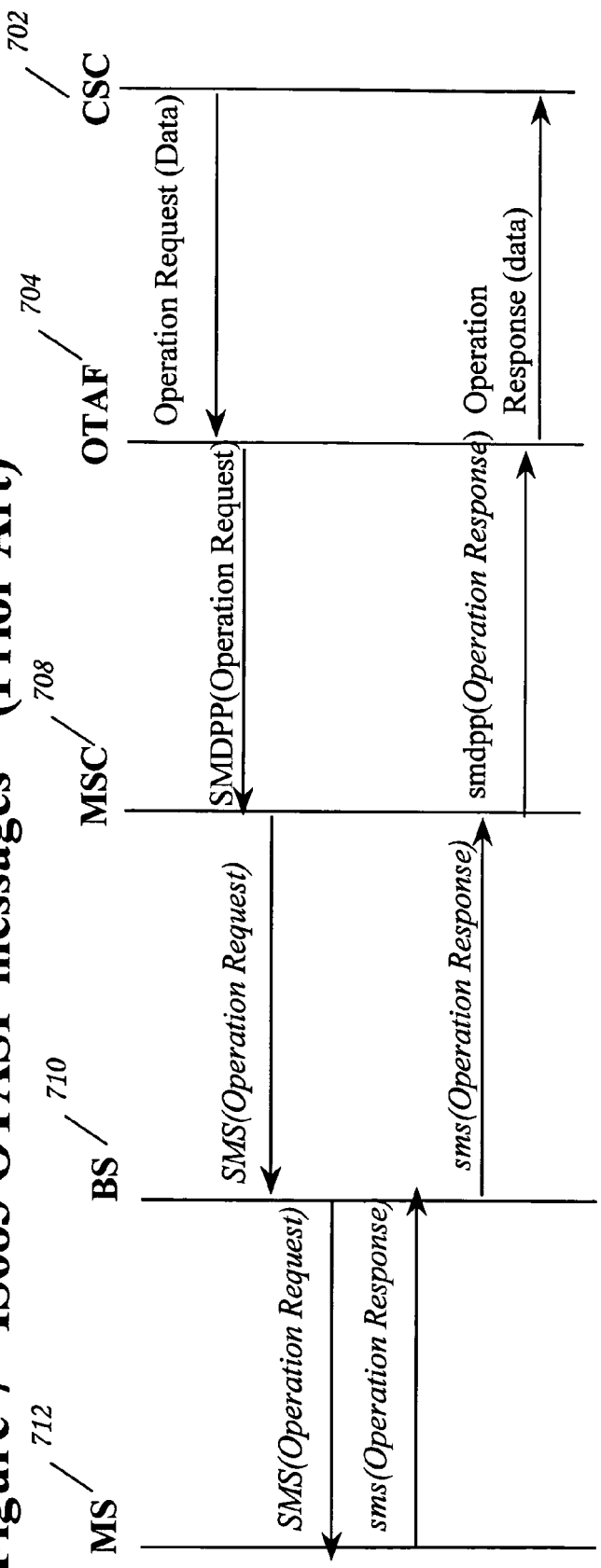

Figure 7 – IS683 OTASP messages – (Prior Art)

Where Operation can be any of the IS683D operations:

i.e. Protocol Capability Request Message, Configuration Request Message, Validation Request Message, Download Request Message, MS Key Request Message, Key Generation Request Message, Re-Authenticate Request Message, SSPR Configuration Request Message, SSPR Download Request Message, 3GPD Configuration Request Message, 3GPD Download Request Message, Commit Request Message

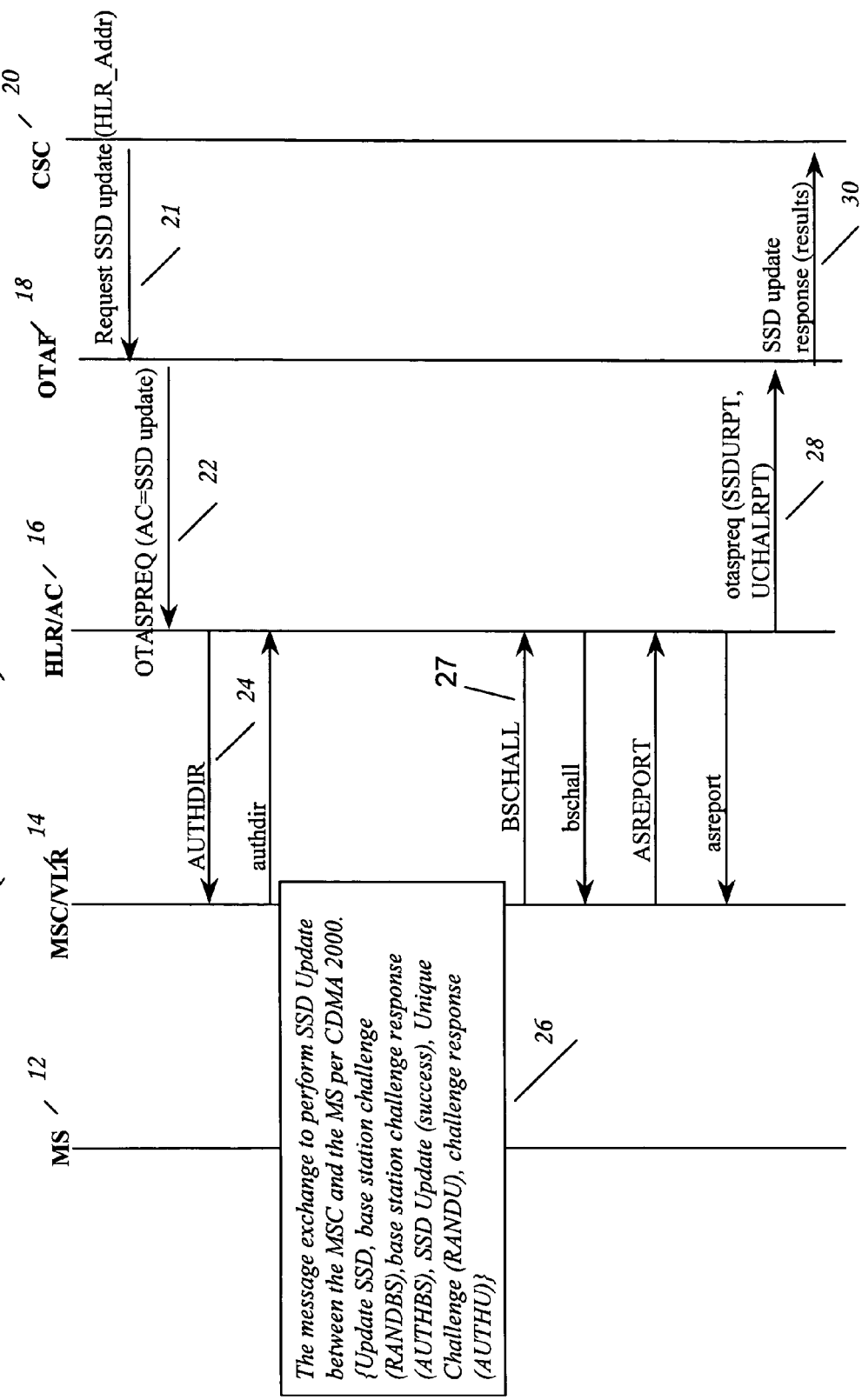

OVER THE AIR PROVISIONING OF A WIRELESS MOBILE STATION USING IP MULTIMEDIA SUBSYSTEM MODE

BACKGROUND

This invention is directed to over the air (OTA) provisioning of wireless mobile stations and more specifically to OTA provisioning of dual mode wireless mobile stations where an IP Multimedia Subsystem (IMS) mode is utilized to accomplish the initial provisioning for operation of the mobile station for that mode.

Commonly used wireless communication devices such as cellular handsets are now prevalent in many parts of the world. Before a new wireless mobile station (MS), also referred to as a handset, can support user communications, it must be provisioned, i.e. it must have its Mobile Identity Number (MIN) and the necessary data to access the service providers network stored in it. A known way of provisioning a MS, e.g. a cellular handset, is for the user to take the MS to a service center of the system operator where the MS is plugged into specialized equipment to accomplish an interchange of information with the MS. For example, the specialized equipment reads and stores an electronic serial number of the MS, and in cooperation with the MS stores the MIN, Mobile Directory Number, Preferred Roaming List (PRL) in the MS. The specialized equipment also stores the Authentication Key (A-Key) and Shared Secret Data (SSD) in the MS. The A-Key and SSD are later utilized by the network to authenticate the MS as a valid MS.

Some wireless communications systems support Over the Air Service Provisioning (OTASP) wherein a new, unprovisioned, MS can become provisioned by utilizing wireless signaling. A predetermined provisioning protocol and defined messages associated with the protocol are utilized on an over the air channel between the MS and a radio access node (RAN) of the service provider to provision the MS. Provisioning messages are exchanged between the MS and a provisioning center of the system operator. Such OTA provisioning is desirable by customers since it eliminates the otherwise required trip by the customer to a service center of the system operator and allows service provider to sell their service through mass marketing channels like Electronic Stores and Super Markets. A customer can buy a new phone from a store, come home and call the service provider to have their service started and the phone updated with the necessary data all in the privacy and convenience of their home. For example, IS683D protocol can be used by systems that implement it to provision CDMA 3G-1X terminals over the air.

As wireless communications systems continue to evolve, different types of communication systems are in use. Many of these communication systems are incompatible with the other systems, i.e. a single mode MS designed for one system cannot engage in communications in another system utilizing different communication technology, for example a single mode CDMA phone can not work in a GSM network. As an attempt to provide greater flexibility to users, dual mode MS's are coming into use. These dual mode MS comprise a handset that is capable of communications with first and second communication systems that employ different communication technology, e.g. a terminal may work in both Analog and CDMA mode or in both CDMA and GSM mode. Basically the dual mode MS is analogous to the user simultaneously carrying both a first and second single mode MS. That is, the dual mode MS can typically operate at any one time in one of two different communication technology modes. Although this provides the user with increased communication flexibility, the user typically has to go through a process of updating the data in the MS corresponding to the two different communication technology modes utilized by the MS so that each mode of the MS will be operational in the respective system. To meet this goal there are protocols like IS683D and products based on the same to provision a dual mode Analog/CDMA terminal for both technologies when the MS first accesses the network. Further it is desirable to be able to initially provision a MS regardless of which mode of operation the user selects for a first access.

SUMMARY

It is an object of the embodiments of the present invention to minimize the above difficulty and to provide a method to provision a dual mode CDMA 3G-1X and IMS mode MS when the MS first accesses the network using an IMS mode.

The invention in one implementation encompasses a method in which initial provisioning of a MS using only an IMS protocol to access the network is accommodated by communication infrastructure equipment.

The invention in another implementation encompasses a method in which CDMA 3G-1X SSD parameter in a MS is updated by initiation by communication infrastructure equipment where the MS uses only an IMS protocol to access the network during the update.

DESCRIPTION OF THE DRAWINGS

Features of exemplary implementations of the invention will become apparent from the description, the claims, and the accompanying drawings in which:

FIG. 7 is signal flow diagram illustrating an over the air update of general parameters (e.g. MIN, PRL) in the MS initiated by a CDMA 3G-1X mobile station mode for prior art.

FIG. 8 is signal flow diagram illustrating an over the air update of shared secret data initiated by a CDMA 3G-1X mobile station mode for prior art

DETAILED DESCRIPTION

In general, the described embodiment of the present invention provides a system in which a dual mode MS having an IMS mode and a CDMA 3G-1X mode can be supported. More specifically, the system permits a first initial provisioning of the dual mode MS in the IMS mode, i.e. the dual mode MS has not been previously provisioned for operation in either mode. As used herein, "initial provisioning" means provisioning of a MS that has not been previously provisioned.

One aspect of provisioning requires an update of the general parameters like the MIN, PRL that are utilized by the MS to access the network and to identify itself to the network. This aspect of provisioning the MS requires an update of the general parameters like the MIN and the PRL that are utilized by the MS to access the network for call origination and by the network to page the MS when a call has to be delivered to the MS. This aspect of provisioning the MS in the IMS mode is described herein.

Another aspect of provisioning the MS requires an update of the shared secret data (SSD) that is utilized between the MS and the supporting infrastructure in order to authenticate the MS as a valid user of the system. This aspect of provisioning the SSD in the MS in the IMS mode is also described herein. However, before describing the embodiment of the present invention it will be helpful to understand an OTA prior art implementation of provisioning the general parameters like MIN, PRL and SSD update in a communication system utilizing a CDMA 3G-1X communication mode.

Figure 6:
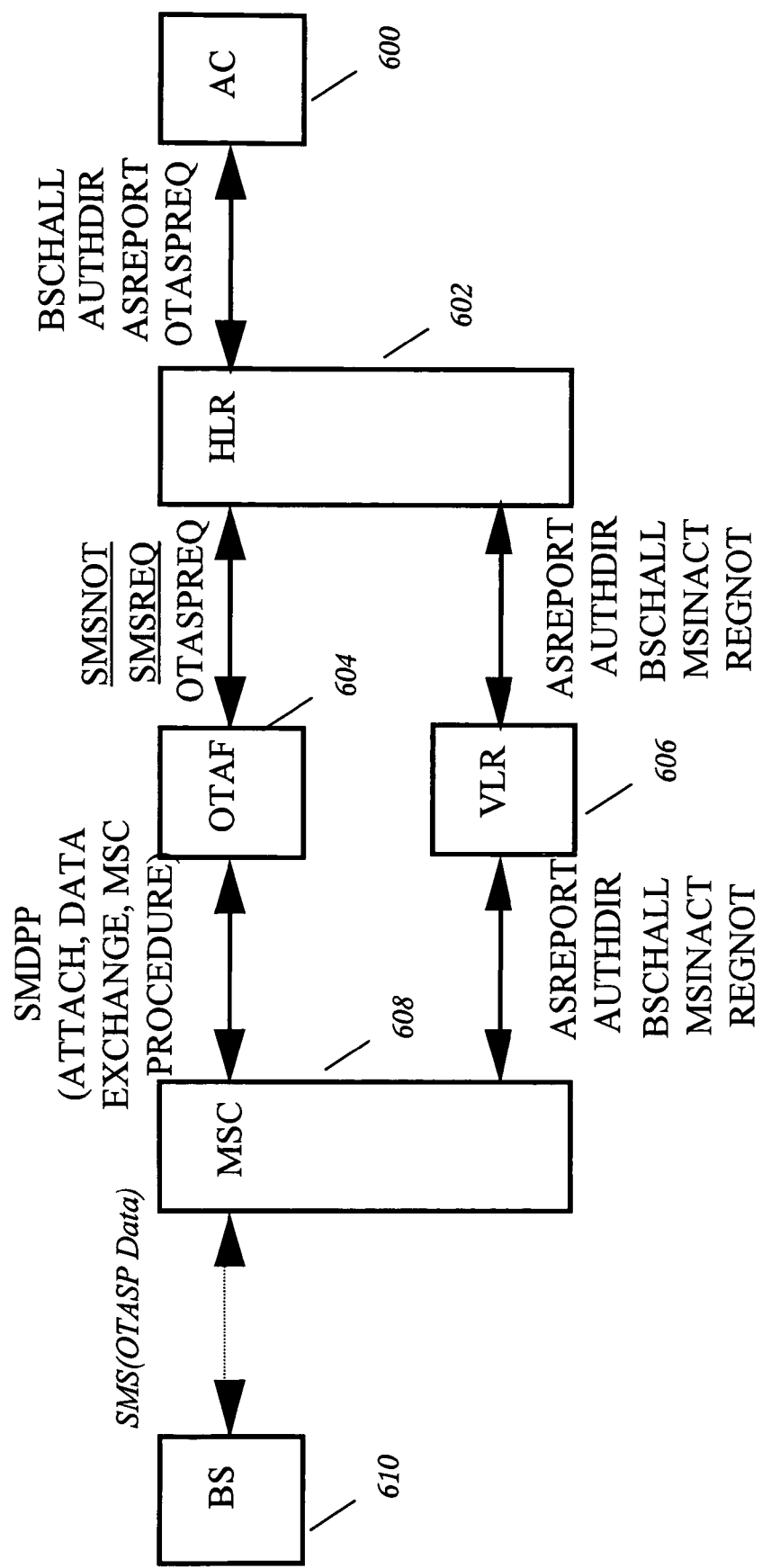
FIG. 6 is a functional block diagram of an embodiment of the prior art.

FIG. 6 is a functional block diagram for performing Over the Air Service Provisioning in a CDMA 3G-1X mode as known in the art. The OTASP data is exchanged between the base station 610 and MSC 608 using CDMA 3G-1X data burst messages. The OTASP data is exchanged between the MSC 608 and the OTA Function (OTAF) 604 using IS41 SMDPP messages. Messages are exchanged between OTAF 604 and HLR 602, between OTAF 604 and VLR 606, between HLR 602 and AC 600 and between MSC 608 and VLR 606 using IS41 protocol messages.

FIG. 7 is a call flow diagram showing the general exchange of Over the Air Service Provisioning (OTASP) messages for a CDMA 3G-1X system and mode based on IS683D protocol as known in the art. General provisioning messages that need no additional effort from the network (e.g. IS683D messages like Protocol Capability Request Message, Configuration Request Message, Validation Request Message, Download Request Message, MS Key Request Message, Key Generation Request Message, Re-Authenticate Request Message, SSPR Configuration Request Message, SSPR Download Request Message, 3GPD Configuration Request Message, 3GPD Download Request Message and Commit Request Message) are exchanged between the OTAF 704 and the MS 712 via the MSC 708 and BS 710. The customer service center (CSC) 702 originates the provisioning messages and receives responding data via return messages.

FIG. 8 illustrates a CDMA 3G-1X communication system in which a wireless MS 12 has wireless communications supported by a mobile switching center (MSC/VLR) 14. A home location register (HLR) 16 includes a combined authentication center (AC) function and is in communication with the MSC 14 and a node/server 18 that provides an over the air function (OTAF). A customer service center (CSC) 20 of the system provider is utilized to support its wireless customers including initial provisioning of the MS.

An SSD update is performed, following a request for initial provisioning by MS 12, by the OTAF server 18 generating an over the air service provisioning request (OTASPREQ) that is transmitted to the HLR 16 over SS7 network using IS725A protocol 22. This results in an AUTHDIR signal over SS7 network using IS725A protocol 24 by the HLR 16 to the MSC 14, which in turn transmits a corresponding request signal to the MS 12 over wireless channel 26. Stored functionality on the MS recognizes the SSD request signal and causes the MS to generate corresponding SSD information in accordance with known protocols. This SSD Update Report information is transmitted over wireless channel 26 to the MSC 14, by channel 27 to the HLR 16, and by channel 28 to the OTAF server 18.

Figure 1:
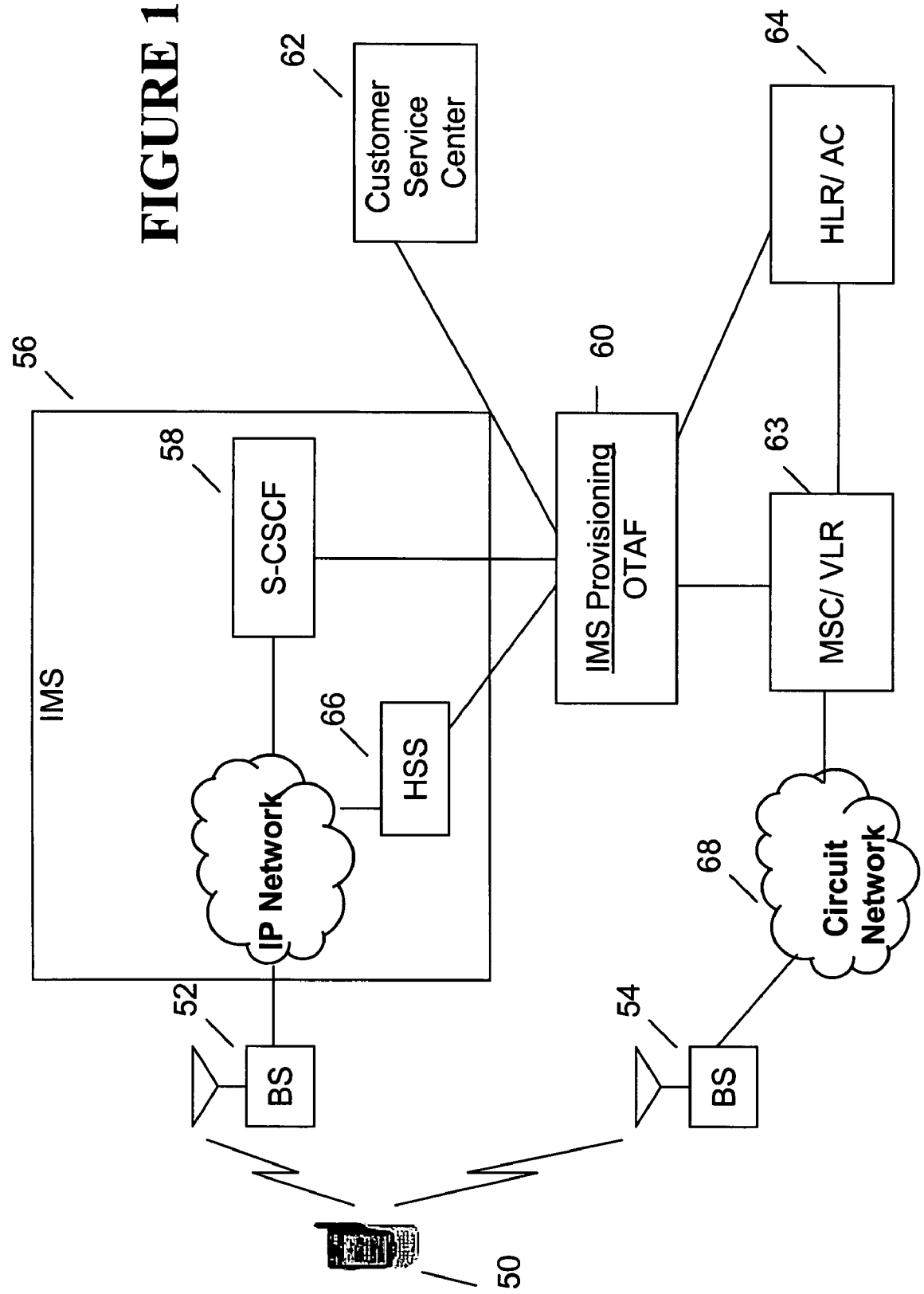
FIG. 1 is a block diagram of a communication system suited for incorporation of an embodiment of the present invention.

FIG. 1 illustrates a communication system that supports an embodiment of the present invention wherein an initial provisioning can be made by a MS operating in the IMS mode. An illustrative MS 50 is capable of dual mode operation, in this exemplary embodiment the two communication modes are IMS and CDMA 3G-1X. The MS 50 communicates with base station 52 using the IMS communication mode and communicates with base station 54 when using the CDMA 3G-1X communication technology. Each of base stations 52 and 54 are only capable of supporting one of the types of communications.

An IMS network 56 is coupled to and supports communications between base station 52 and a server 58 that supports a Serving Call Session Control Function (S-CSCF) such as described in 3GPP TS 23.002—Network Architecture. Server 58 is coupled to server 60 that supports OTASP over IMS. Servers 58 and 60 are connected utilizing an extension of the SIP protocol (RFC3428) protocol. Server 60 interfaces with the customer service center 62 which is used for performing Over the Air Service Provisioning for IMS terminal. The server 60 is connected to an HLR 64 that includes an authentication center function and to the MSC/VLR 63. The server 60 is also connected to a home subscriber server (HSS) 66 that handles the IMS Registration function for IMS subscribers.

Base station 54 is coupled to a circuit network 68 which supports the non-IMS communication technology CDMA 3G-1X. The network 68 is coupled to server 60 via the MSC/VLR 63 so that OTA provisioning utilizing the non-IMS technology CDMA 3G-1X can be accomplished in conjunction with the HLR 64.

In the exemplary embodiment the MS 50 begins as being unprovisioned in either of the dual mode technologies supported. The subscriber utilizing MS 50 desires to initially provision utilizing the IMS mode.

Figure 2:
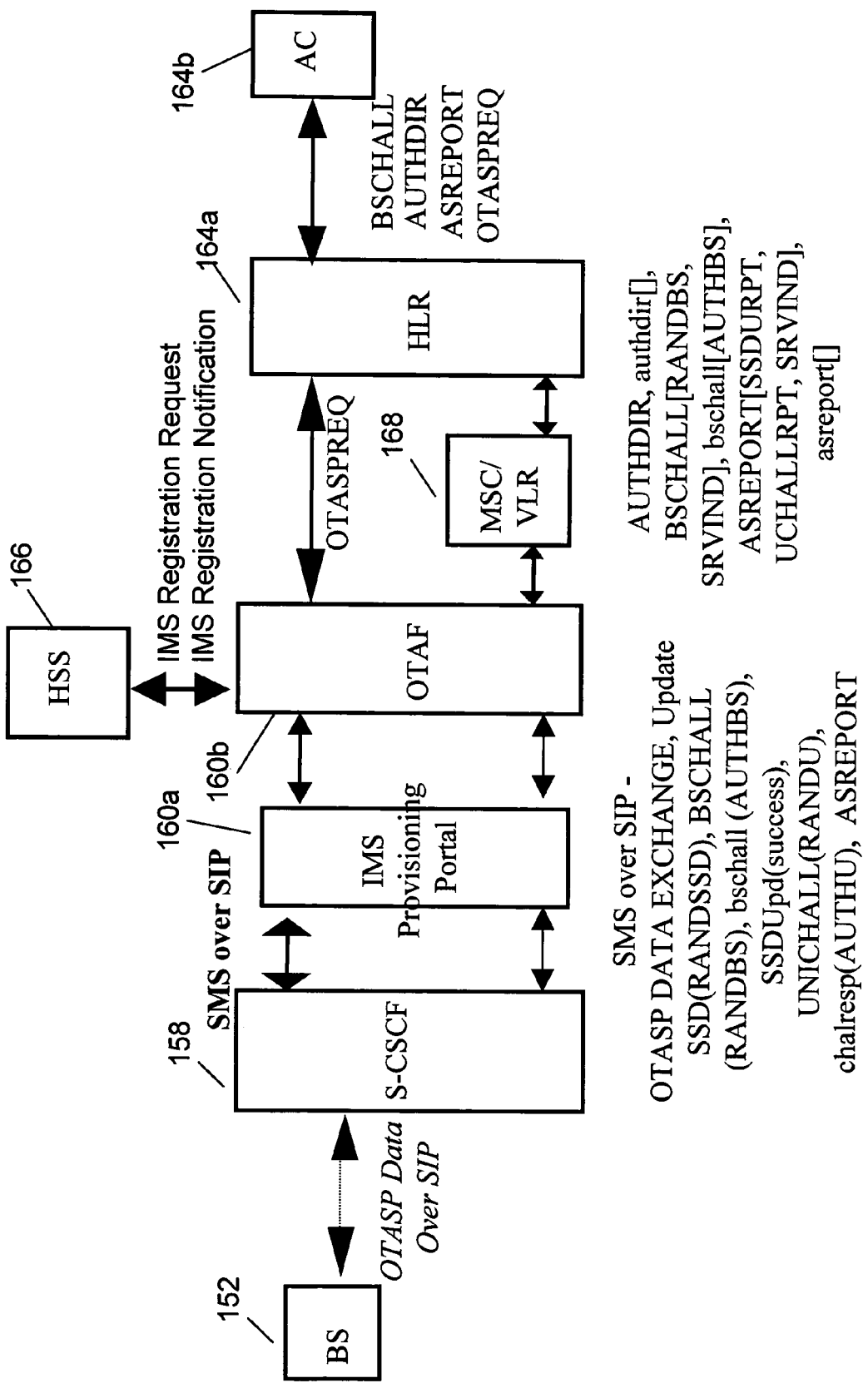
FIG. 2 is a functional block diagram of an embodiment of the present invention.

FIG. 2 is a functional block diagram primarily intended to show the IMS functionality of the communication system of FIG. 1. Elements in FIG. 2 that correspond with elements in FIG. 1 are assigned reference numerals that are 100 greater than the corresponding reference numerals in FIG. 1. The OTASP data is exchanged between the base station 152 and S-CSCF 158 using session initiation protocol extensions (SIP) per RFC3428.Although the IMS provisioning portal 160a and the OTAF 160b are shown as separate elements for clarity of understanding in FIG. 2, the functionality of both may be combined on a single server 60 as shown in FIG. 1. Provisioning related information is communicated between the S-CSCF 158 and the IMS provisioning portal 160a and OTAF 160b utilizing short message service (SMS) over SIP per RFC3428. Signals and information exchanged via SMS over SIP related to OTASP data exchange between the S-CSCF 158 and the IMS provisioning portal 160a and OTAF 160b are shown below these elements.

The OTAF 160b in conjunction with the IMS provisioning portal 160a will determine based on the respective signaling of whether a provisioning request is being made for IMS provisioning or for CDMA 3G-1X provisioning. If the latter provisioning has been requested, then the OTAF 160b communicates with the MSC/VLR 168 and HLR 164a in conjunction with the AC 164b to exchange the required signaling and information associated with provisioning on an MS. Representative signals and information associated with such a provisioning are shown below the HLR in FIG. 2. If an IMS provisioning has been requested, then the OTAF 160b communicates with the IMS provisioning portal 160a and S-CSCF 158 to exchange the required signaling and information associated with such provisioning of the MS. Additionally, messages related to SSD Update are also exchanged between the MS and the MSC via the BS 152, S-CSCF 158, IMS provisioning portal 160a and OTAF 160b to accomplish as SSD Update in the MS. (By contrast the SSD update messages would be exchanged directly between the MS and MSC via the BS for the prior art.

Figure 3:
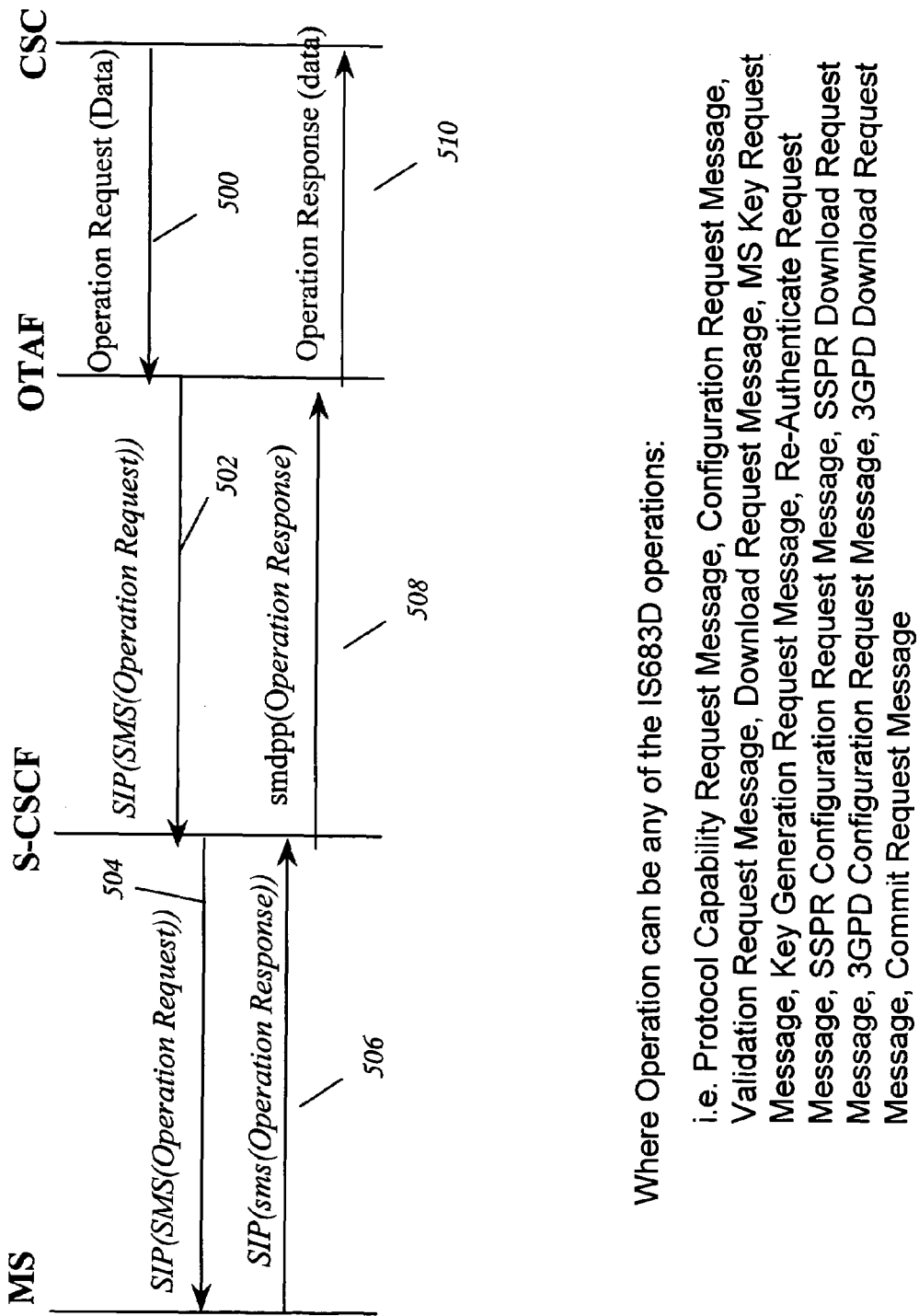
FIG. 3 is signal flow diagram illustrating an over the air update of general parameters (e.g. MIN, PRL) in the MS initiated by an IP Multimedia Subsystem mobile station mode in accordance with an embodiment of the present invention.
Figure 4:
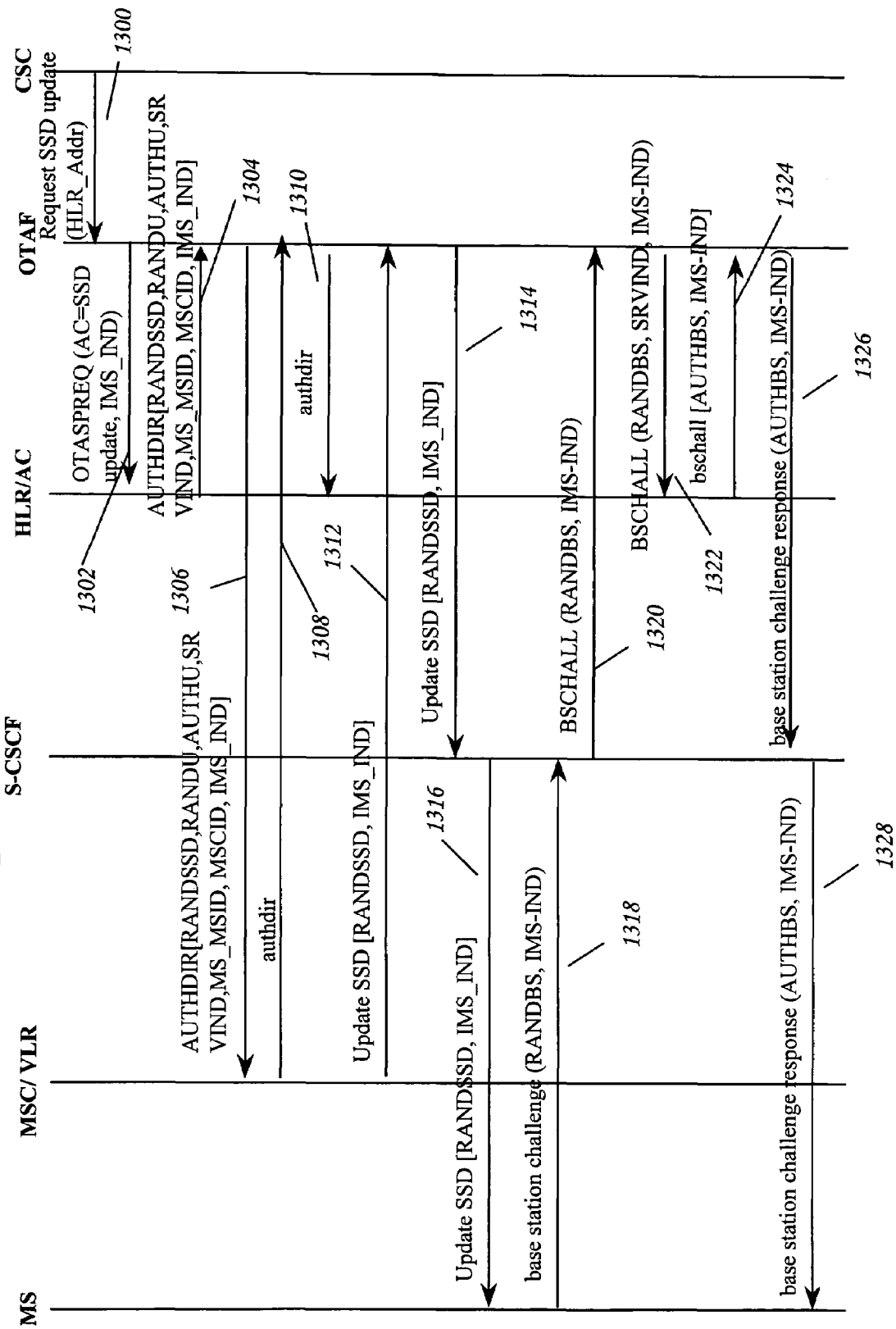
FIG. 4 is signal flow diagram illustrating an over the air update of shared secret data initiated by an IP Multimedia Subsystem mobile station mode in accordance with an embodiment of the present invention.
Figure 5:
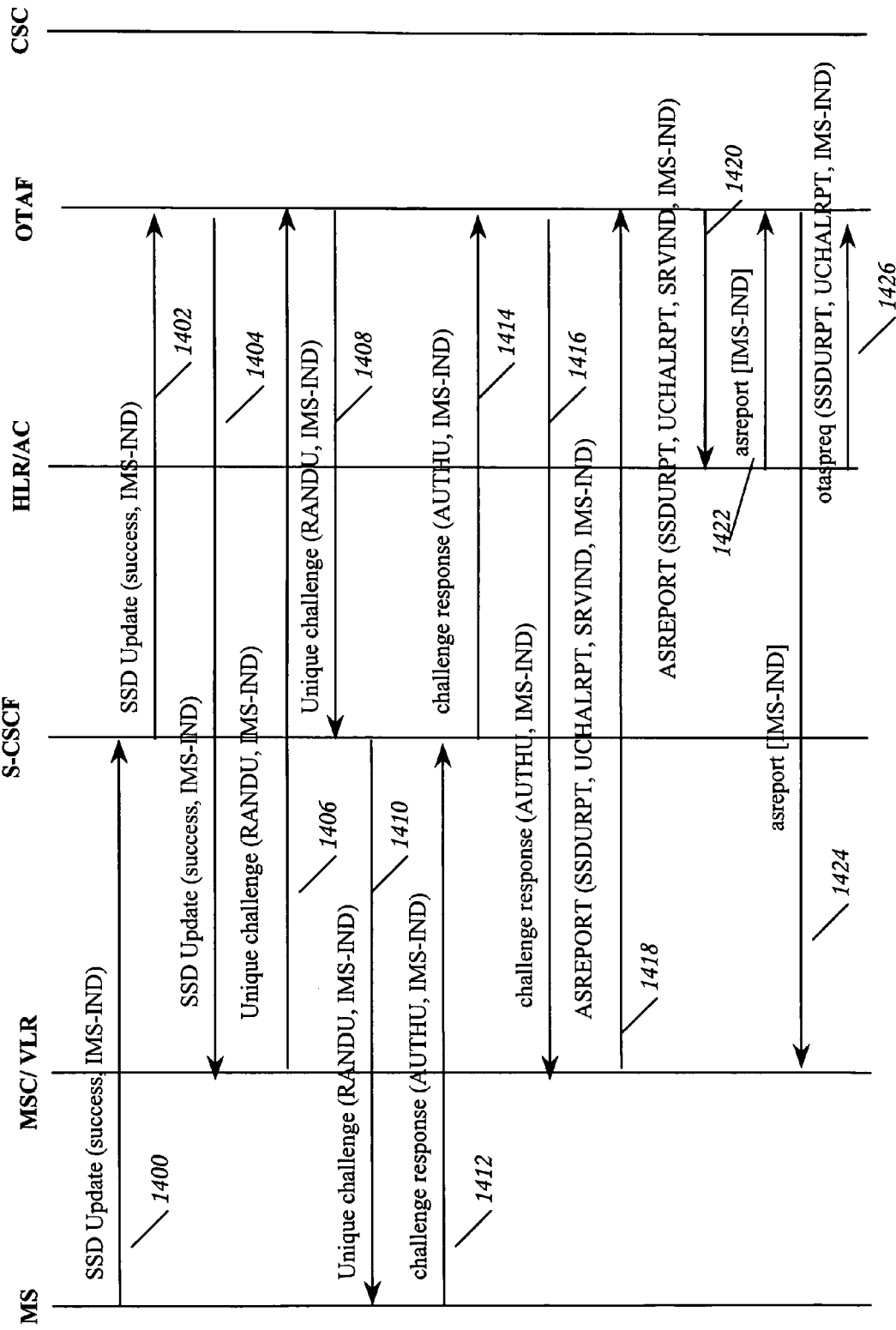
FIG. 5 is a continuation of FIG. 4.

In order to better appreciate the description of the signaling shown in FIGS. 4 and 5 that implements SSD updates, an appreciation of the general provisioning of IMS mobile stations will be helpful as shown in FIG. 3. An IMS dual mode MS may request OTASP provisioning by sending a request to a provisioning portal server which would detect that the MS needs initial provisioning. The provisioning portal server will start a provisioning session with OTAF using an SIP based protocol; see messages 500 and 510. The OTAF determines the right set of parameters (MIN, IMSI, PRL, etc.) using the CSC interface to the customer service center. After the correct set of parameters is determined, the CSC directs the OTAF to initiate corresponding IS-683 messages 502 and 504 using the SIP message method (RFC3428). Reply information from the MS is conveyed to the CSC via messages 506, 508 and 510.

The OTAF will continue to interface with HLR/AC using IS-725A. The existing IS-725A interface (now part of IS-41E) is enhanced so that the OTAF can facilitate the SSD update message exchange via OTAF over IP via the IMS system, as opposed to using an CDMA 3G1X circuit voice mode. New IS-683 messages are defined to pass: update SSD [RANDSSD], base station challenge (RANDBS), challenge response [AUTHBS], SSD Update (success), unique challenge (RANDU), challenge response (AUTHU) between the MS and the OTAF over the SIP message method. The OTAF will support the following new messages in IS-725A for this interworking: AUTHDIR, authdir[ ], BSCHALL[RANDBS, SRVIND], bachall [AUTHBS], ASREPORT[SSDURPT, UCHALLRPT, SRVIND], asreport [ ]. These messages are part of IS41 protocol but are currently only passed between the HLR and the MSC.

For a Network Initiated Provisioning session (OTAPA session), the OTAF requests the HSS if the subscriber is IMS registered using Diameter Sh User Data Request (UDR) message as specified by 3GPP in TS 29-329. This replaces SMSREQ for a circuit OTAPA in the prior art. The HSS would need to support Service Indication CDMA OTASP for this purpose. The HSS will respond to the UDR with a User Data Answer (UDA) as specified in 3GPP TS 29-329. This replaces smsreq rr for circuit OTAPA in the prior art.

If the subscriber is not IMS registered, OTAF will try to locate the subscriber in the circuit MSC as under prior art. However, if there is no circuit MSC (i.e. the network is fully IMS) or the terminal supports IMS mode only, the OTAF registers with the HSS for notification when the subscriber registers using the SIP SUBSCRIBE and NOTIFY methods. This replaces the "sms notification indicator" in SMSREQ and a subsequent SMSNOT for OTAPA in the prior art. If the IMS subscriber is available for OTAPA, the OTAF will have the address of the S-CSCF at this point from the UDA/NOTIFY and will continue the session in a manner similar to OTASP described previously for IMS mode.

The S-CSCF, OTAF (IMS Provisioning), HLR/AC, MSC/VLR and HSS as well as the customer service center may all comprise servers which contain software that supports the required functionality. Each server may have a microprocessor supported by ROM, RAM, hard drive storage and input/output interface for incoming/outgoing communications.

FIGS. 4 and 5 show signaling initiated by the CSC requesting an SSD update of the MS via IMS mode.

FIG. 4 shows signaling initiated by the customer service center (CSC) requesting an SSD update. When the CSC transmits signal 1300 {Request SSD Update (HLR_Addr)} to the OTAF, the CSC also indicates that the corresponding MS is using IMS mode. On receiving signal 1300 the OTAF generates a corresponding signal 1302 {OTASPREQ (AC=SSD update, IMS-IND)} and sends it to the HLR/AC; this message is similar to the current IS725A message with an added parameter IMS-IND to indicate that the MS is in IMS mode. The HLR/AC upon receiving signal 1302 generates responsive signal 1304 {AUTHDIR [RANDSSD, RANDU, AUTHU, SRVIND, MS_MSID, MSCID, IMS_IND)} that is sent back to the OTAF which relays it as signal 1306 to the MSC/VLR. The MSC/VLR generates responsive signal 1308 {authdir} sent back to the OTAF which relays it as signal 1310 to the HLR/AC. The MSC/VLR also generates signal 1312 {Update SSD [RANDSSD, IMS-IND]} that is sent to the OTAF which relays it as signal 1314 to the S-CSCF which in turn relays it as IMS mode signal 1316 to the MS operating in the IMS mode. The MS processes the signal 1316 and generates a responsive signal 1318 {base station challenge (RANDBS, IMS-IND)} sent to the S-CSCF. It in turn generates and sends signal 1320 {BSCHALL (RANDBS, SRV-IND, IMS-IND)} to the OTAF. The OTAF generates a responsive signal 1322 {BSCHALL (RANDBS, SRVIND, IMS-IND)} sent to the HLR/AC. The HLR/AC processes this signal, generates signal 1324 {bschall response [AUTHBS, IMS-IND]}, and transmits it to the OTAF. The OTAF generates signal 1326 {base station challenge response (AUTHBS, IMS-IND)} and sends it to S-CSCF which in turn relays it as signal 1328 to the MS.

The MS processes the contents of signal 1328 to respond with {SSD Update (success, IMS-IND)} signal 1400 via IMS transmission path to the S-CSCF. The S-CSCF relays it as signal 1402 {SSD update (success, IMS-IND)} to the OTAF. The OTAF recognizes signal 1402 as an SSD update request and generates a signal 1404 {SSD update (success, IMS-IND)} that is transmitted to the MSC/VLR. In response to receiving signal 1404, the MSC/VLR generates a signal 1406 {Unique challenge (RANDU, IMS-IND)} that is transmitted to the OTAF. Upon receipt of signal 1406, the OTAF relays it as signal 1408 {Unique challenge (RANDU, IMS-IND)} to the S-CSCF which in turn transmits signal 1410 {Unique challenge (RANDU, IMS-IND)} to the MS. Upon receiving this signal the MS processes it in accordance with a known algorithm and transmits a corresponding reply signal 1412 {challenge response (AUTHU, IMS-IND)} transmitted to the S-CSCF which passes it as signal 1414 {challenge response (AUTHU, IMS-IND)} to the OTAF. Upon recognizing the receipt of signal 1414, the OTAF forwards it as signal 1416 {challenge response (AUTHU, IMS-IND)} to the MSC/VLR. The MSC/VLR processes this signal and generates a corresponding signal 1418 {ASREPORT (SSDURPT, UCHALPRT, SRVIND, IMS-IND)} that is transmitted to the OTAF which relays it as signal 1420 to the HLR/AC. The HLR/AC processes signal 1420 and generates a corresponding reply signal 1422 {asreport [IMS-IND]} sent to the OTAF which relays it as signal 1424 to the MSC/VLR. The HLR/AC also generates a signal 1426 {otaspreq (SSDUPRT, UCHALRPT,IMS-IND)} that is sent to the OTAF. The operations mentioned in the above paragraphs utilize existing IS725A, IS41, CDMA 3G-1X messages. This embodiment of the present invention adds the IMS_IND flag as stated to indicate that the operation is to be carried on for IMS access mode. Additionally, the network elements are altered as required in the message exchange so that a CDMA 3G-1X access is not required for SSD update.

The signaling explained above illustrates how a MS operating in IMS mode can obtain an OTA SSD update. The server hosting the OTAF provides an interface between IMS signaling by the MS and S-CSCF, and more traditional cellular system signaling by the MSC/VLR, HLR/AC.

In the above SSD signaling descriptions, signals between the MS and S-CSCF utilize the IMS mode. Signals between the OTAF and HRL/AC, and the OTAF and MSC/VLR utilize the conventional cellular signaling of SS7, i.e. not IMS signaling.

Numerous alternative embodiments of the present invention exist. For example, the IMS Provisioning could be implemented as a separate entity from the OTAF if desired.

The OTAF in one example employs one or more computer-readable signal-bearing media. The computer-readable signal-bearing media store software, firmware and/or assembly language for performing one or more portions of one or more embodiments of the invention. The computer-readable signal-bearing medium for the OTAF in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method implemented by communication infrastructure equipment for provisioning a wireless mobile station, MS, comprising the steps of:
    receiving first signals at an over the air function, OTAF, server, including a request for an update of shared secret data, SSD, of the MS where the first signals use a different signaling protocol other than Internet Protocol Multimedia Subsystem, IMS, signaling, the different signaling protocol being understood by a mobile switching center, MSC, and home location register, HLR;
    converting the first signals, including the SSD update request, into corresponding second signals utilizing IMS signaling protocol;
    transmitting the second signals to the MS;
    receiving third signals from the MS generated in response to the receipt of the second signals, the third signals having the same signaling protocol as the second signals;
    converting the third signals into fourth protocol signals having the same signaling protocol as the first signals and transmitting the fourth signals from the OTAF server to the HLR, whereby the MS using only IMS protocol can obtain provisioning from the communication infrastructure equipment that does not utilize IMS signaling among at least some of its nodes;
    receiving, from the MS that has not been previously provisioned, an Over the Air Service Provisioning, OTASP, request where said request is transmitted using IMS signaling;
    wherein the OTASP request is received at a Serving Call Session Control Function, S-CSCF, node that relays the request as a short messaging system message using session initiation protocol, SIP, to the OTAF server.

2. The method of claim 1 further comprising the step of incorporating a flag in messages that form the first signals wherein the flag identifies the MS associated with the messages as utilizing IMS signaling.

3. The method of claim 1 wherein the first signals are converted into second signals by an IMS Provisioning Portal/OTAF, node that receives the first signals from the MSC and HLR.

4. The method of claim 3 wherein the third signals are converted into fourth signals by the IMS Provisioning Portal/OTAF node.

5. The method of claim 1 wherein the third signals include a base station challenge signal and the second signals include a base station challenge response signal.

6. The method of claim 1 wherein the second signals include an over the air SSD Update, Update SSD, signal as an IS683 message.

7. The method of claim 1 wherein the second signals include Update SSD, base station challenge response (AUTHBS),and Unique Challenge (RANDU) signals all conveyed as IMS signaling.

8. The method of claim 7 wherein the third signals include BSCHALL (RANDBS), SSD Update (success), and challenge response (AUTHU) signals all conveyed as IMS signaling.

9. The method of claim 1 wherein the OTAF server sends the second signals as IS683 messages over IMS using session initiation protocol, SIP, per RFC3428.

10. An apparatus incorporated in communication infrastructure equipment for provisioning a wireless mobile station, MS, comprising:
    an over the air function, OTAF, server adapted to receive first signals that include a request for an update of shared secret data, SSD, of the MS where the first signals use a different signaling protocol other than Internet Protocol Multimedia Subsystem, IMS, signaling, the different signaling protocol being understood by a mobile switching center, MSC, and home location register, HLR;
    the OTAF server adapted to convert the first signals, including the SSD update request, into corresponding second signals utilizing IMS signaling protocol and transmit the second signals via a Serving Call Session Control Function, S-CSCF, node to the MS;
    the OTAF server adapted to receive third signals from the MS via the S-CSCF node, the third signals generated in response to the receipt of the second signals, the third signals having the same signaling protocol as the second signals;

the OTAF server adapted to convert the third signals into fourth protocol signals having the same signaling protocol as the first signals and transmit the fourth signals to the HLR, whereby the MS using only IMS protocol can obtain over the air provisioning;

the OTAF server receiving, from the MS that has not been previously provisioned, an Over the Air Service Provisioning, OTASP, request where said request is transmitted using IMS signaling, the OTASP request being received at a Serving Call Session Control Function, S-CSCF, node that relays the request as a short messaging system message using session initiation protocol, SIP, to the OTAF server.

11. The apparatus of claim 10 wherein the OTAF server converts the first signals into second signals at a time where the MS has not been previously provisioned.

12. The apparatus of claim 10 wherein the OTAF server receives the third signals from the MS at a time where the MS has not been previously provisioned.

13. The apparatus of claim 10 wherein the OTAF server converts the first signals into second signals and transmits the second signals representing an over the air SSD Update, Update SSD, request as IS683 messages over IMS using SIP (RFC3428).

* * * * *